Sept. 26, 1939.  G. T. MARKEY  2,174,004
SHUTTER TYPE FEED OPENING FOR DEVELOPER BATTERIES
Filed May 27, 1938
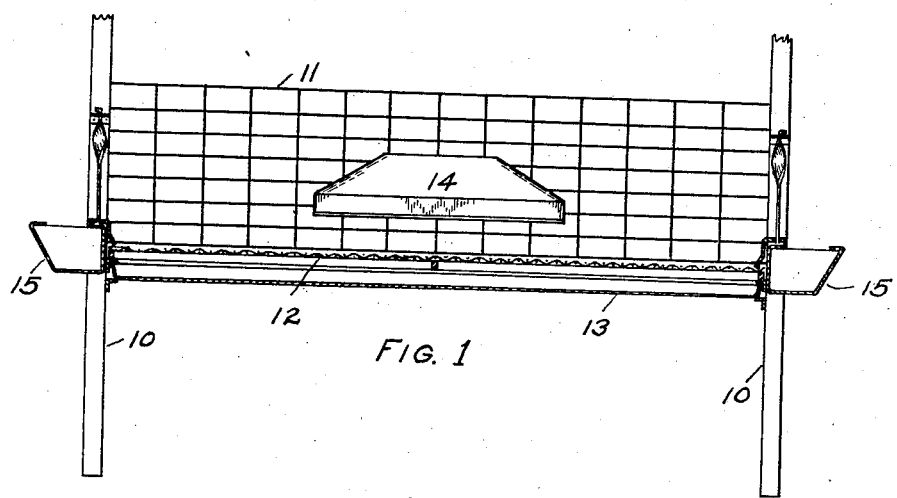
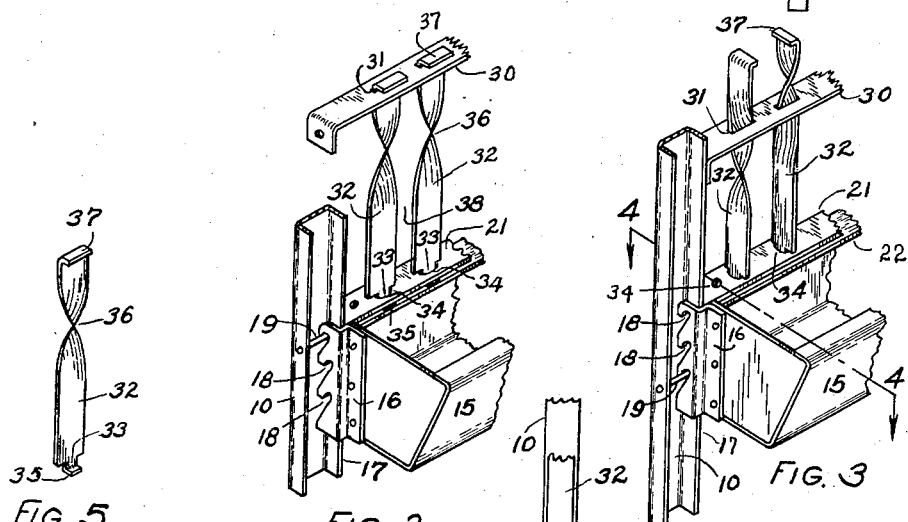
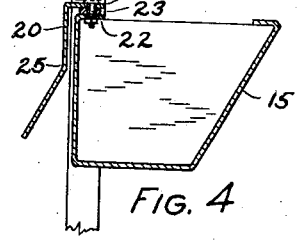
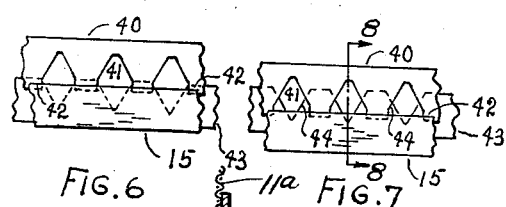
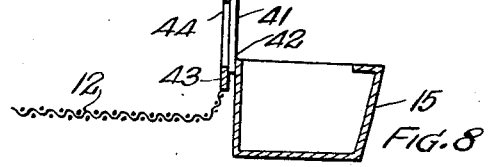
INVENTOR.
GEORGE T. MARKEY
BY A. S. Kroh
ATTORNEY Patented Sept. 26, 1939

2,174,004

UNITED STATES PATENT OFFICE 2,174,004

SHUTTER TYPE FEED OPENING FOR DEVELOPER BATTERIES

George T. Markey, Fort Atkinson, Wis., assignor to James Manufacturing Company, Fort Atkinson, Wis.

Application May 27, 1938, Serial No. 210,352

3 Claims. (Cl. 119—17)

The present invention relates to batteries for growing chicks and providing means whereby the feed trough may be raised and the openings to the trough enlarged simultaneously.

When the chicks are first placed in a battery having therein a warming hover they are very small. Modern hovers of the class are adjustable vertically and for the small chicks they are positioned so there is room only for the chicks to get under the hover but as they grow it is necessary to raise the hover. No satisfactory means has yet been provided for adjusting the feeding device to the growing chicks comparable to the adjusting features of the hover.

In the present invention I provide such means, the design being such that when the trough is in its lowest position, suitable for the small chicks, the feed openings to the trough will be of suitable size for small chicks.

I provide preferably three or more heights for the trough to accommodate stages of growth but it is also necessary to enlarge the openings. This also is successfully accomplished in my device.

Chicks are very active and if the feed openings are too large the chick will escape through the openings, if too small they will not be able to feed with comfort therefore the height of the trough and the size of the openings in my device are clearly corelated and are adjusted simultaneously.

Thus as the chicks grow and the operator concludes that the trough should be higher and the openings larger, all that is necessary is to raise the trough one notch. This operation will automatically enlarge the openings. Thus applicant has provided a very convenient, simple, and efficient device of the class.

To these and other useful ends my invention consists of parts, combinations of parts or their equivalents, and mode of operation, as hereinafter described and claimed and shown in the accompanying drawing in which:

Fig. 1 is a sectional view of a chick brooder equipped with my invention.

Fig. 2 is a fractional perspective view of my regulating device when the trough is in its lowest position.

Fig. 3 is a fractional perspective view of my invention illustrating the trough in its highest position.

Fig. 4 is a transverse sectional view of the device taken on line 4—4 of Figure 3.

Fig. 5 is a perspective view of a shutter.

Figs. 6 and 7 illustrate a modification.

Fig. 8 is a transverse sectional view taken on line 8—8 of Figure 7.

As thus illustrated, the battery comprises preferably corner pieces 10—10, these pieces preferably extend downwardly forming supporting legs for the battery. The side and end walls of the battery are made of similar material preferably of wire mesh suitable for the smallest chick.

Wire mesh 12 is provided as a floor for the chicks and a removable pan 13 is provided for catching the droppings. Reference character 14 designates the hover which is preferably heated by electricity and has means (not shown) whereby it may be adjusted to various heights to accommodate the growing chicks.

In the present invention I may supply watering troughs having a similar construction to my feed trough. For the present the feed trough only will be shown and described. The trough is in its entirety designated in the various figures by reference numeral 15. These troughs may be of any suitable shape or size.

I provide end brackets 16 suitably secured to the trough as illustrated in Figures 2 and 3. These brackets are Z-shaped so as to loosely embrace the inner flanges 17 of the corner pieces 10.

I provide notches 18 in the forward flange of member 16 and a pin 19 which extends through the flanges of member 10 whereby the trough may be supported on the pins on any one of the notches thus to provide selective positions for the trough, the design being such that when the trough is in the position shown in Figure 2 it will be held at a suitable height for the smallest chicks. Thus it will be seen that it is a comparatively simple matter to raise or lower the trough to the various positions.

I provide an inner guard plate 20 having a flange 21 which extends over the top of folded edge 22 of the trough and is spaced therefrom by means of washers 23 and held to the trough by means of bolts 24. The lower edge of member 20 is bent as at 25 so this edge extends inwardly and downwardly as clearly illustrated in Figure 4 thus to provide a droppings shield for the outer wall of the inclosure.

I provide a stationary horizontal bar 30 having slots 31 adapted to loosely embrace plates 32. These plates are reduced in width at their bottoms forming members 33 which are loosely embraced by apertures 34 in member 21 the ends of members 33 being bent at right angles as at 35 thus bars 32 are secured to the trough but are free to rotate. Bars 32 are twisted preferably one half turn as at 36. The twists extend to member 30 when the trough is in its lowest position (see Figure 2) the upper ends of the bars being bent at right-angles as at 37 to prevent the bars from accidentally leaving the openings.

In Figure 3 I illustrate the bars as being held with the flat sides transverse to the trough and in Figure 2 I illustrate the bars with their flat sides parallel to the trough. In this latter position, the bars are of a width and suitably spaced to provide openings as at 38 which will permit the smallest chicks to feed from the trough and the bars are spaced whereby when they are in the position as shown in Figure 3 the largest chicks will be able to feed from the trough.

Thus twist 36 in the bars and notches 18 may be designed to thereby accommodate three different stages of growth. Four notches may be provided if desired to thereby accommodate four stages of growth or provide four different positions of openings and height for the chicks as they grow.

It will be understood that when notches 18 are spaced differently the twist 36 must be differently shaped so each notch will provide a relatively different opening.

As illustrated, alternate bars are caused to turn in opposite direction as the trough is raised or lowered. Clearly by providing similar twists to all bars they may be caused to turn in the same direction simultaneously.

I have illustrated in Figures 1 to 5 inclusive my preferred form of adjustable openings. I may elect to use the form shown in Figures 6, 7 and 8, wherein the inclosure may be exactly as shown in Figure 1.

The troughs and their adjustments may be exactly as illustrated in Figures 2 and 3. In these designs I provide a plate or wire strip 40 having a number of spaced inverted V-shaped notches 41. This strip is secured to the trough as at 42 and will move up and down with the trough. I also provide a stationary strip 43 which is secured to the wall and floor of the inclosure as illustrated in Figure 8. Strip 43 is provided with a corresponding number of V-shaped notches 44, these notches being positioned in vertical alignment with notches 41.

Thus it will be seen as illustrated in Figure 6 that when the trough is in its highest position, the full size of opening 41 is provided and when the trough is in the lowest position as illustrated in Figures 7 and 8, a small diamond shaped opening is provided.

Thus the openings are regulated as to size by the position of the trough as in the other figures but the adjustment of the openings is accomplished in a different manner.

Clearly many other means may be used for providing various sized openings and other detail changes may be made in the device as illustrated without departing from the spirit and scope of the present invention as recited in the appended claims.

Having thus shown and described my invention, I claim:

1. An inclosure of the class described having a feed trough exterior thereto and means having adjustable openings forming a part of said inclosure, said trough having means providing a number of selective vertical positions, said first means having operating connections to said trough whereby the openings will be enlarged or reduced as the trough is raised or lowered to selective positions.

2. An inclosure of the class described having a feed trough exterior thereto, means having adjustable openings operatively connected to said trough forming a part of the inclosure, said trough having a number of selective vertical positions, said openings formed by vertically positioned spaced bars, the lower ends being rotatably connected to said trough and at their upper ends being slidably mounted in a stationary member and having a twisted portion adapted to move through said stationary member whereby the space between strips will be widened or reduced as the trough is raised or lowered from one position to another.

3. An inclosure of the class described having a feed trough exterior thereto and means having adjustable openings operatively connected to said trough forming a part of said inclosure, said trough having a number of selective vertical positions, said openings formed by spaced vertically positioned bars, the lower ends being rotatably connected to said trough and their upper ends having a slidable connection in a stationary member, the upper end of said bars being twisted, said bars having their sides parallel to the trough to thereby form narrow openings when the trough is in its lowest position, said bars being turned by said twisted portion to thereby enlarge said openings as the trough is raised.

GEORGE T. MARKEY.